(12) United States Patent  
Guillouet et al.

(10) Patent No.: US 11,685,299 B2  
(45) Date of Patent: Jun. 27, 2023

(54) ADJUSTMENT DEVICE FOR A HEAD REST OF A VEHICLE SEAT AND VEHICLE SEAT

(71) Applicant: Faurecia Autositze GmbH, Stadthagen (DE)

(72) Inventors: Erwan Guillouet, Hespe (DE); Sergej Teichrib, Nienstädt (DE); Ghislain De Montleau, Hannover (DE); Clement Jarrin, Ismaning (DE)

(73) Assignee: Faurecia Autositze GmbH, Stadthagen (DE)

( * ) Notice: Subject to any disclaimer, the term of this patent is extended or adjusted under 35 U.S.C. 154(b) by 168 days.

(21) Appl. No.: 17/365,460

(22) Filed: Jul. 1, 2021

(65) Prior Publication Data

US 2022/0001778 A1 Jan. 6, 2022

(30) Foreign Application Priority Data

Jul. 2, 2020 (DE) ...................... 10 2020 117 496.9

(51) Int. Cl.
| | |
|---|---|
| *B60N 2/815* | (2018.01) |
| *B60N 2/865* | (2018.01) |
| *B60N 2/42* | (2006.01) |
| *B60N 2/818* | (2018.01) |

(52) U.S. Cl.
CPC ........... *B60N 2/815* (2018.02); *B60N 2/4214* (2013.01); *B60N 2/43* (2013.01); *B60N 2/818* (2018.02); *B60N 2/865* (2018.02)

(58) Field of Classification Search
CPC ........ B60N 2/815; B60N 2/818; B60N 2/865; B60N 2/888
See application file for complete search history.

(56) References Cited

U.S. PATENT DOCUMENTS

| | | | | |
|---|---|---|---|---|
| 5,934,750 | A * | 8/1999 | Fohl | B60N 2/844 297/216.12 |
| 6,533,351 | B2 | 3/2003 | Deptolla | |
| 7,070,235 | B2 | 7/2006 | Schilling | |
| 8,979,203 | B1 * | 3/2015 | Sutter, Jr. | B60N 2/844 297/408 |
| 10,427,572 | B2 | 10/2019 | Jeong | |
| 10,562,425 | B2 | 2/2020 | Jarrin | |
| 2007/0164593 | A1 * | 7/2007 | Brockman | B60N 2/847 297/408 |
| 2015/0258924 | A1 * | 9/2015 | Ishihara | B60N 2/862 297/216.12 |

(Continued)

FOREIGN PATENT DOCUMENTS

| | | |
|---|---|---|
| DE | 19942977 A1 | 3/2001 |
| DE | 10025675 C2 | 1/2003 |
| DE | 10260582 B3 | 6/2004 |

(Continued)

*Primary Examiner* — David R Dunn  
*Assistant Examiner* — Tania Abraham  
(74) *Attorney, Agent, or Firm* — Barnes & Thornburg LLP (57) ABSTRACT

The present disclosure relates to an adjustment device for a head rest of a vehicle seat, including a locking device for adjusting a in relation to a back rest connection in a longitudinal direction and a vertical adjusting, where a locking device for locking the adjustment device is provided which comprises a release lever to be activated by the user which swivels a blocking element which in turn swivels a locking element.

15 Claims, 4 Drawing Sheets

(56) References Cited

U.S. PATENT DOCUMENTS

2018/0257531 A1\* 9/2018 Jarri .................. B60N 2/844

FOREIGN PATENT DOCUMENTS

| EP | 1572494 | B1 | 9/2005 |
| EP | 3372445 | A1 | 9/2018 |
| KR | 1020190112538 | A | 10/2019 |
| WO | 2004056606 | A1 | 7/2004 |
| WO | 2017086600 | A1 | 5/2017 |

\* cited by examiner

ADJUSTMENT DEVICE FOR A HEAD REST OF A VEHICLE SEAT AND VEHICLE SEAT

PRIORITY CLAIM

This application claims priority to German Patent Application No. DE 10 2020 117 496.9, filed Jul. 2, 2021, which is expressly incorporated by reference herein.

BACKGROUND

The present disclosure relates to an adjustment device for a head rest of a vehicle seat and a vehicle seat including an adjustment device.

SUMMARY

According to the present disclosure, a vehicle seat includes a head rest and an adjustment device for the head rest.

In illustrative embodiments, the adjustment device comprises an adjustment mechanism and a locking device which can be unlocked by the user, usually by means of a handle, to allow the user free adjustment in the longitudinal direction and the vertical direction. Subsequently the user can relock the locking device in the new position, in particular, by releasing the handle.

In illustrative embodiments, the locking device locks a first and second component which may be e.g. a link of the adjustment mechanism and a head rest support; in principle, however, other components of the adjustment device may also be locked with one another to prevent adjustment.

In illustrative embodiments, the locking device comprises several adjustable elements, in particular, a release lever pivoting upon actuating the handle, a blocking element, and a locking element which collaborate, in particular, in the manner of a functional chain. These adjustable elements are hinged onto the first of the two components adjustable in relation to one another; the locking element comprises a locking region which locks in a receptacle of the second component.

In-between the blocking element and the locking element two active surfaces which collaborate in the locked state. The two active surfaces provide a reduction or suppression of the clearance (free play reduction) of the two components locked with one another; in the locked default state the two active surfaces lie in contact. To that end the blocking element may be spring biased, in particular, into its default position so that its active blocking surface contacts the active locking surface of the locking element with spring bias, e.g. by way of sliding engagement as clamping surfaces, in particular, with one or both active surfaces being curved surfaces.

In illustrative embodiments, this creates a clamping effect, in particular, with a spring bias, generating a secure suppression of the clearance and a free play feeling and also a counter-force against usual forces and moments exerted.

In illustrative embodiments, an engagement of clamping surfaces for suppressing clearance shall mean, in particular, active surfaces of two elements which allow, upon yielding or, respectively, subsequent widening of the distance between the elements, a further spring biased readjustment or, respectively, re-pivoting, in particular, of the blocking element, making it possible to automatically reduce the clearance appearing (widening of the distance). Thus, the active surfaces are slidingly pressed into one another, in particular, in a spring biased manner.

In illustrative embodiments, a clamping effect and/or clamping surfaces shall mean an embodiment where active surfaces are biased in a pivoting direction with increasing radius from the pivoting axis.

In illustrative embodiments, a high degree of crash safety is provided by a crash abutment of the locking element onto the release lever. In the event of a crash strong forces act e.g. in the longitudinal direction on the components, in particular, also on the head rest support. Due to the high acceleration in the longitudinal direction, e.g. above a threshold value, the second component and the locking element the locking region of which is received in the receptacle of the second component are accelerated in the longitudinal direction. Hereby, the locking element will end up, after a short acceleration path or safety distance respectively, in contact with a crash abutment surface on the release lever stopping the locking element. Thus, it is possible so safely block any further pivoting movement of the locking element and avoid unlocking of the active surfaces which would otherwise be possible given the strong forces exerted in the longitudinal direction, even against the spring bias of the blocking element.

In illustrative embodiments, the crash abutment between the crash abutment surface of the release lever and the counter-surface of the locking element is provided separate from the active surfaces of the regular locking procedure or blocking motion. Thus, for one thing, it is possible to achieve a secure suppression of the clearance and thereby a firm lock of the components via the active surfaces, whereby the shaping of the active surfaces and possibly the spring bias of the blocking element can be suitable formed and dimensioned for locking and the unlocking process, and, furthermore, separate from this, the crash locking or crash absorption is provided.

In illustrative embodiments, suitable lever arms and adjustment motions, as well as embodiments of the active surfaces may be provided as sliding surfaces or, respectively, sliding and clamping surfaces without also having to provide for, e.g. a secure receptacle of the crash lock in these active surfaces. Even if the active surfaces in the event of a crash, due to the swiveling motion of the locking element, should initially loosen somewhat or, respectively, the active surfaces slide alongside one another, a release will be stopped in time by the crash abutment. Hereby, it is also possible to design the dimensions of the free path of the crash adjustment independent from the dimensions of the active surfaces and the regular blocking.

In illustrative embodiments, comparative devices do not provide for, in particular, this separate design of the active surfaces of the proper locking and the crash abutment so that compromises are present here which, e.g., do not permit a smooth-running sliding process of the active surfaces for the locking mechanism because this would impair the crash safety to be provided by the active surfaces in addition.

A high degree of crash safety is achieved in that a line extends between the crash abutment surface of the release lever impinged by the locking element in the crash situation and its picot axis in the acceleration direction of the locking element, i.e. e.g. the longitudinal direction. Thus, the accelerated locking element will in the crash situation press the crash abutment surface of the release lever in the direction of its picot axis so that, by virtue of this force, no torque acting on the release lever is generated.

In illustrative embodiments, the locked blocking element may be secured by the spring bias of the blocking element and, in particular, also by a spring bias of the release lever, whereby the release lever in the default position e.g. comes into contact with an abutment in a spring biased manner. A secure resetting into the default position after an unlocking procedure is achieved.

In illustrative embodiments, the locking element itself it not spring biased and is pressed into the lock by the blocking element. This creates the advantage, as opposed to e.g. a spring bias of the locking element into the default position, of a stronger clamping effect between the active surfaces and a secure unlocking process.

In the unlocking process, the actuated release lever may e.g. swivel together with an operative arm of the blocking element, whereby, owing to the design of the operative arms and the leverage forces, suitable swiveling paths and moments can be generated. Hereby, for example, the release lever is not in contact with the blocking element in the default position and comes into contact with the blocking element following a short swiveling path, whereupon it swivels against its spring bias, thereby causing the active surfaces to disengage. Owing to the distance between the release lever and the blocking element and, preferably, the locking element, an undue release caused be e.g. vibrations and affecting forces is safely blocked.

In the unlocking process the locking element is actively swiveled out of the lock by the swiveled blocking element. To that end the blocking element, in the course of its swiveling movement in which the active surfaces disengage, can come into contact with a lever arm of the locking element and thereby actively swivel the locking element out of the lock. Hereby, preferably, the lever arm is spaced apart from active locking surface. This distance, too, again safely blocks an undue release of the default position caused be e.g. vibrations and affecting forces.

Thus, an active functional chain is created between release lever, blocking element and locking element for active unlocking, providing a high level of safety and robustness, in particular, compared to systems that merely release a spring biased locking element.

Following the unlocking the user can adjust the components as needed in the longitudinal direction and the vertical direction and e.g. subsequently release the handle. Hereby, for example, the spring biased release lever is returned to its default position and releases the blocking element which in turn pivots back into its default position due to its spring bias thereby pressing the locking element into the locked default position in that the active surfaces slide alongside one another. Thus, locking and unlocking are reversible.

In illustrative embodiments, a sufficiently fine adjustability can be attained e.g. in that the locking region and the receptacle are designed in the form of e.g. rows of teeth comprising a plurality of teeth engaging with one another enabling a fine ratchet and adjustability in discrete locking positions while still providing firm locking.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

A locking device 1 shown in FIGS. 1 through 4 serves to lock an adjustment device 2, shown, in particular, in FIGS. 5A-5D, 6A and 6B, which is in turn provided for adjusting a head rest 3 in relation to a back rest 4 or, respectively, a back rest connection 40 attached to the back rest 4. The adjustment device 2 allows adjustment in the direction X, i.e. in the longitudinal direction, generally representing the direction of travel of the vehicle, and in the direction Z, i.e. the vertical direction. Thus, the user can, by operating a handle 5 shown in FIGS. 5A-5D thereby unlocking the locking device 1 to be unlocked, suitably adjust the head rest 3 in relation to the back rest 4 in the direction X and the direction Z, whereby, in FIGS. 5A through 5D, the respective end positions are shown, i.e. the foremost and rearmost as well as the highest and lowest position. Subsequently, the user can re-lock the locking device 1, e.g. by letting go or releasing respectively the handle 5. An adjustment in the transverse direction (direction Y) is advantageously not provided.

Figure 6A:
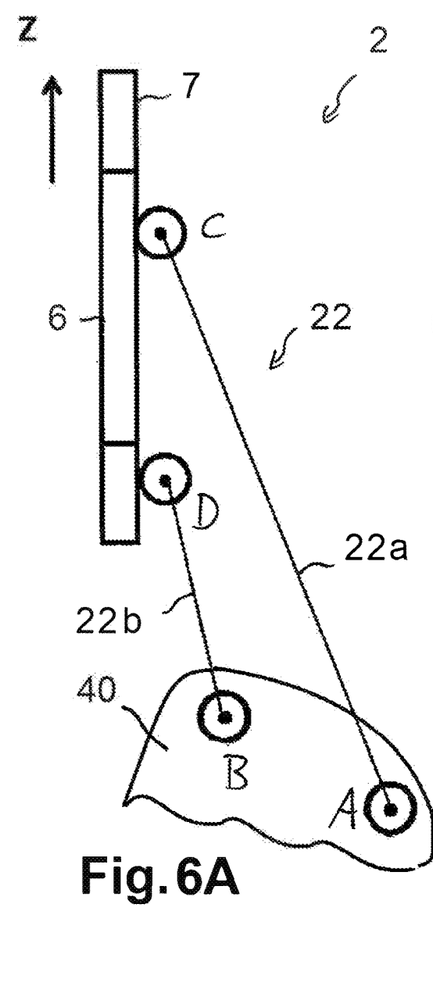
FIG. 6A shows an embodiment of an adjustment device including an adjustment mechanism for longitudinal and vertical adjustment.
Figure 6B:
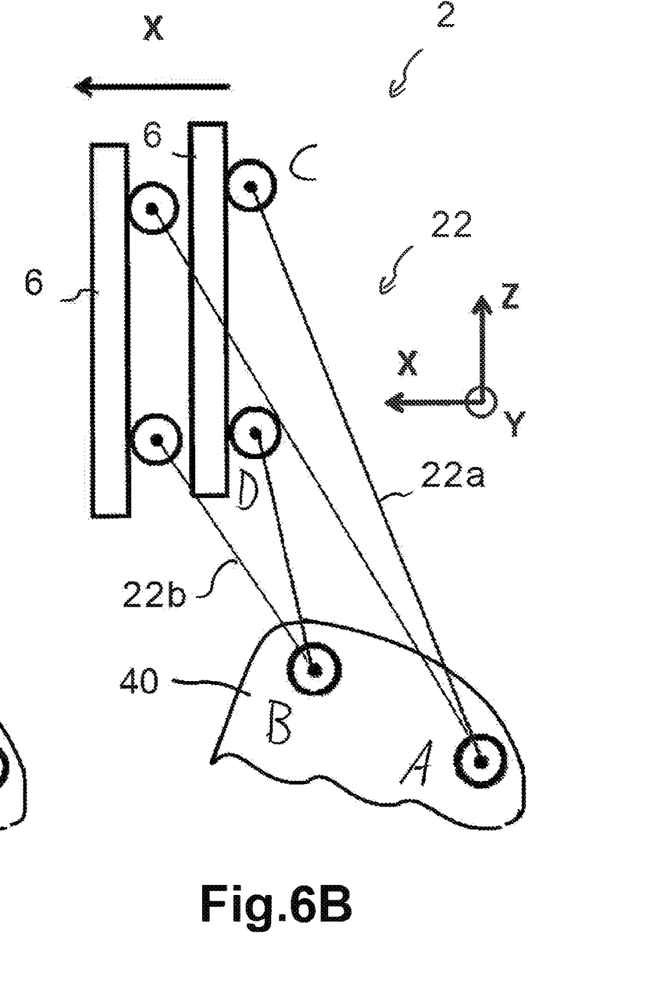
FIG. 6B shows the adjustment device of FIG. 6A in another arrangement.

FIGS. 6A and 6B show a comparative adjustment device 2. Here, the comparative adjustment device 2 forms an adjustment mechanism 22, e.g. as a quadruple joint mechanism including links 22a, 22b for longitudinal adjustment of a guide device 6 in relation to the back rest 4, whereby the head rest support 7 is vertically adjustable in the guide device 6. The locking device 1 serves to lock the adjustment device 2 in the various X and Z positions, whereby two of the adjustable elements of the adjustment device 2 are locked, e.g. the head rest support 7 and one element of the adjustment mechanism 22, e.g. one of the links 22a, 22b.

Figure 1:
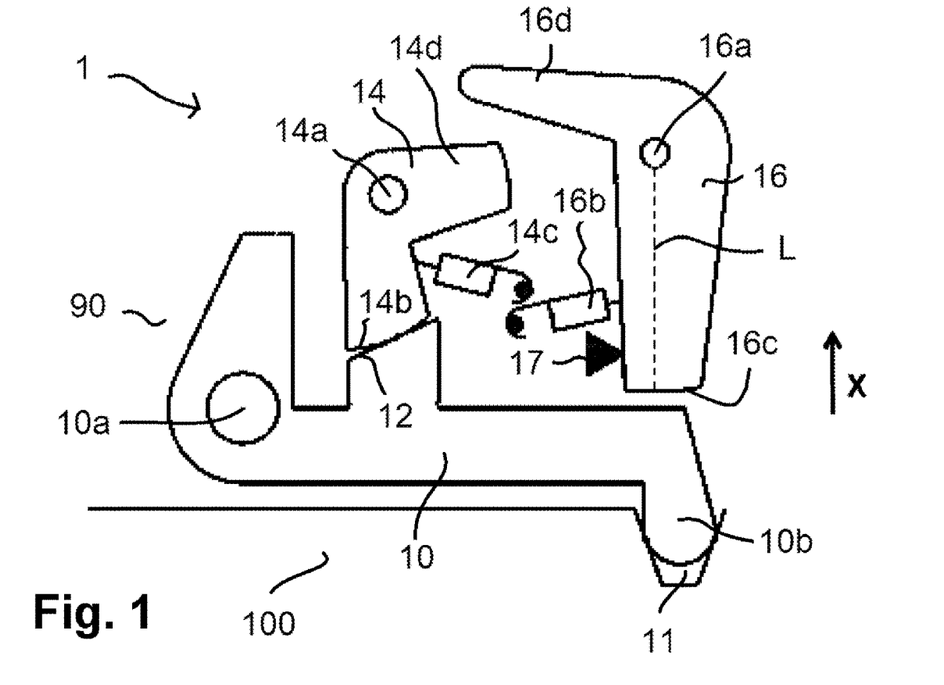
FIG. 1 shows a locking device for a head rest of a vehicle seat according to an embodiment in its locked, closed position.
Figure 2:
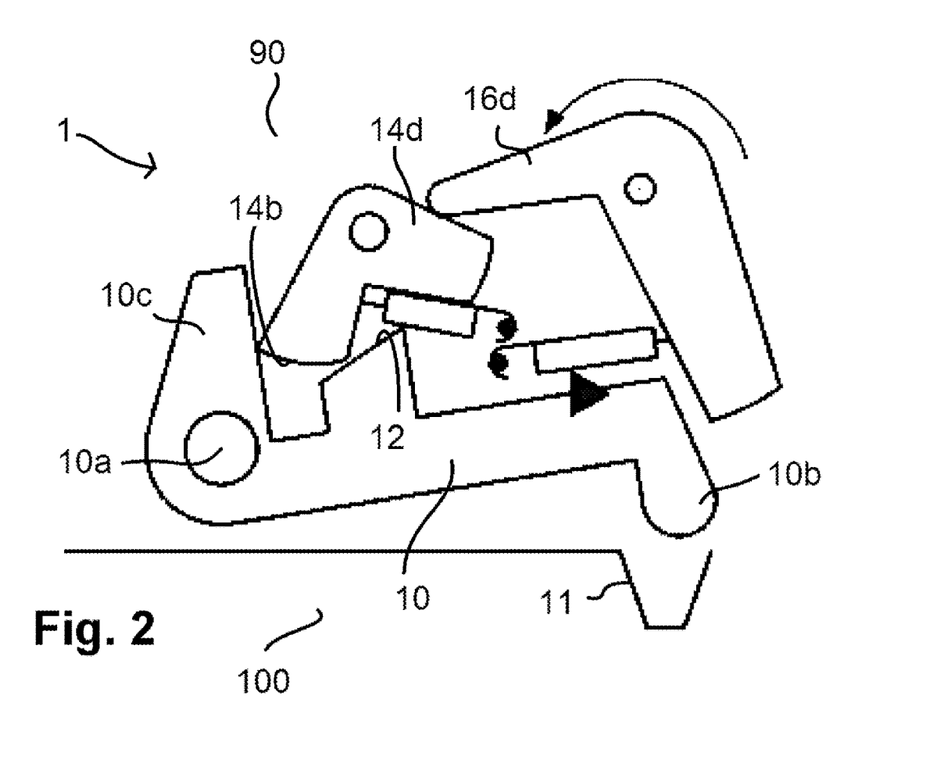
FIG. 2 shows the locking device in its open, unlocked position.
Figure 3:
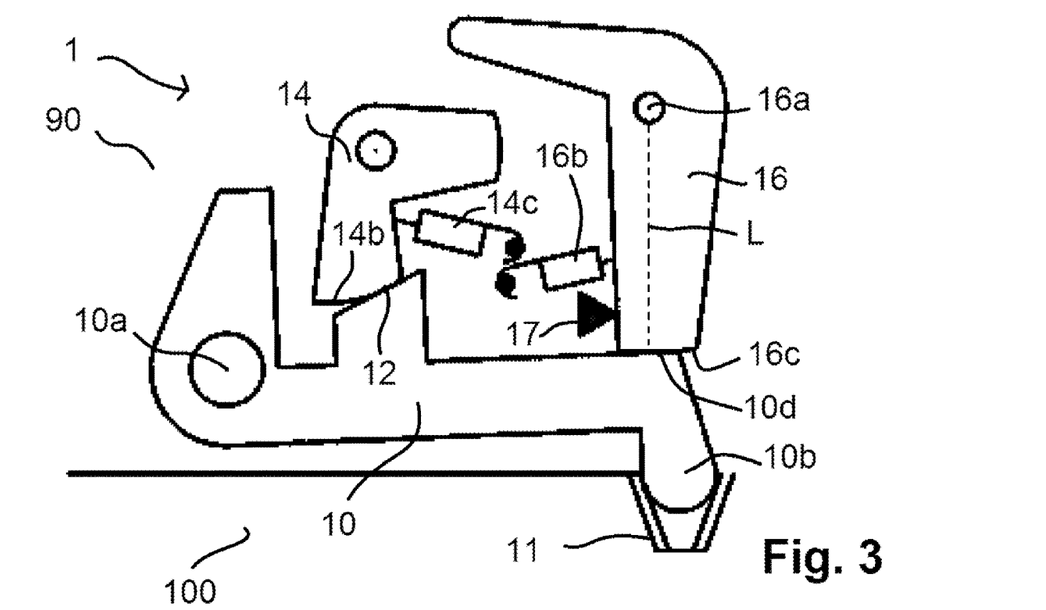
FIG. 3 shows a crash situation of the closed locking device.
Figure 4:
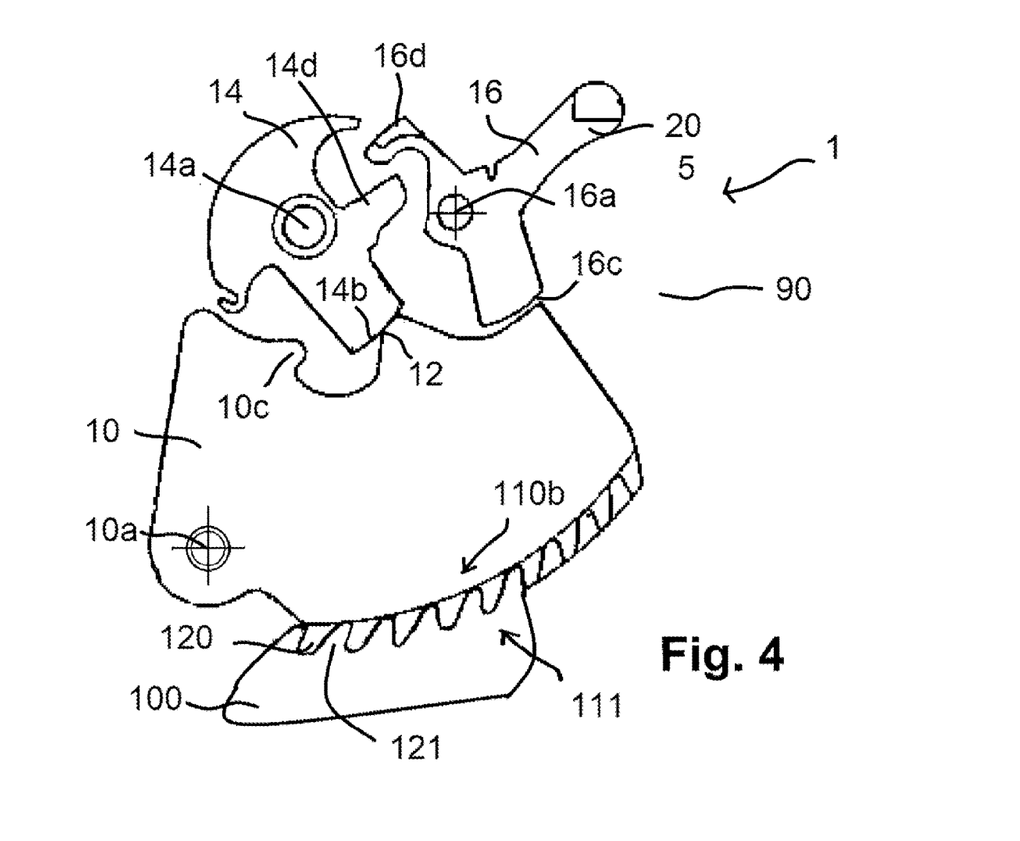
FIG. 4 shows a locking device according to a further embodiment in its closed position.
Figures 5A, 5B:
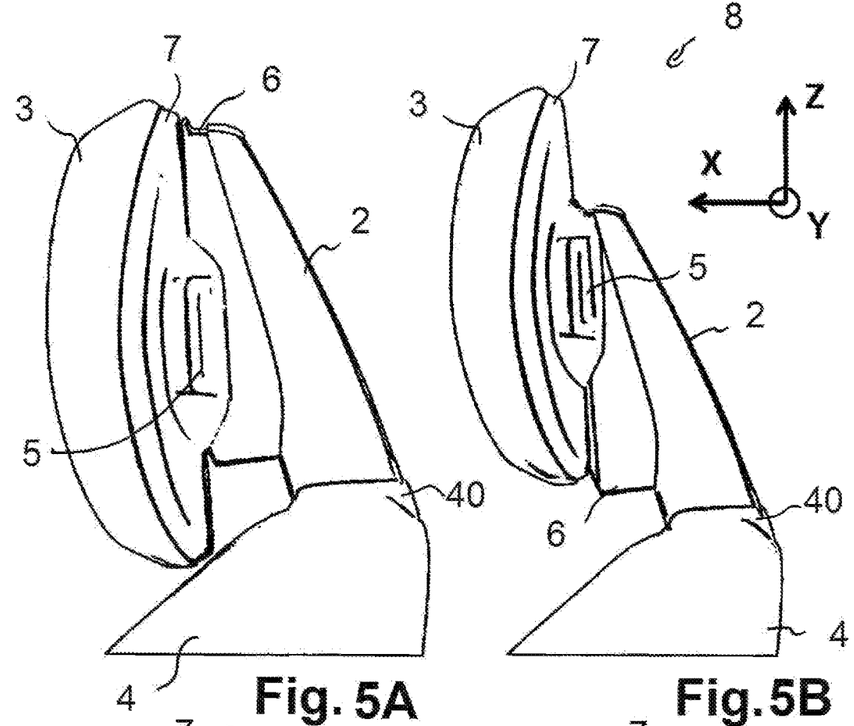
FIG. 5A shows a back rest including a head rest, an adjustment device and an adjustment mechanism in different vertical and longitudinal positions.
FIG. 5B shows the headrest of FIG. 5A in another arrangement.
Figure 5C:
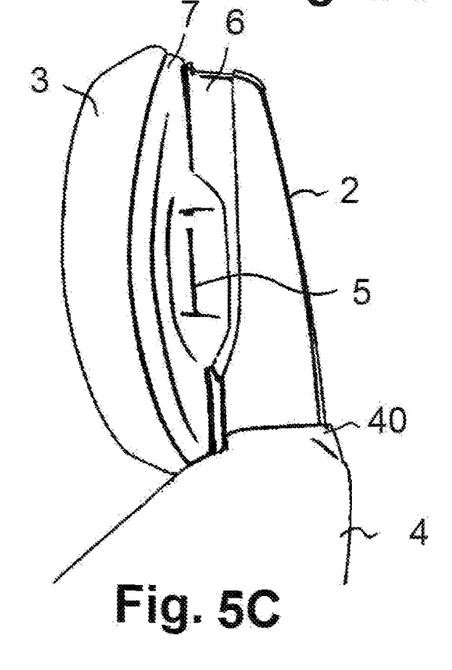
FIG. 5C shows the headrest of FIG. 5A in another arrangement.
Figure 5D:
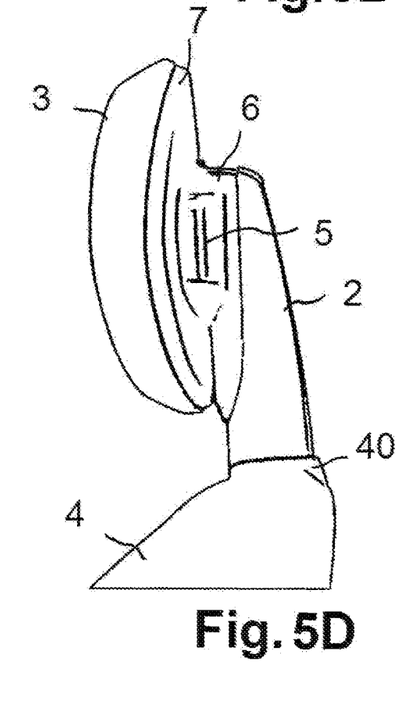
FIG. 5D shows the headrest of FIG. 5A in another arrangement.

FIGS. 1-3 show the kinematics of the locking device 1 according to an embodiment. FIG. 4 represents an embodiment with more complexly designed elements according to these kinematics. Hereby, a first component 90 and a second component 100 are shown which can be adjusted relative to one another and are locked by the locking device 1. Hereby, e.g. the first component 90 may be e.g. the head rest support 7 and das second component 100 e.g. one element of the adjustment mechanism 22, e.g. a link 22 a,b, or vice versa.

According to FIG. 1 the locking device 1 comprises a release lever 16, a blocking element 14 and a locking element 10 each mounted pivotably in swiveling axles 16a, 14a and 10a on the first component 90. In the locked default position of FIG. 1, the locking region 10b of the locking element 10 engages with a receptacle 11 of the second component 100.

The locking element 11 further comprises an active locking surface 12, in contact with which, in the default position of FIG. 1, is the active blocking surface 14b of the pivotable blocking element 14 which is biased by a blocking element spring 14c into its default position. Upon swiveling the e.g. rounded active blocking surface 14b comes into contact with the active locking surface 12 thereby swiveling the locking element 10 into its locking position of FIG. 1 so that its locking region 10b is pressed into the receptacle 11. With its active blocking surface 14b the blocking element 14 reversibly blocks the active locking surface 12 of the locking element 10. This leads to a clamping for suppressing the clearance in that the active surfaces glide along one another and are spring biased pressed against each other; if, e.g., subsequently, the distance between the components 90, 100 is slightly widened by usual loads as a result of which the active surfaces 12, 14b disengage, then the blocking element 14 can follow by swiveling and eliminate the clearance.

In the locked default position of FIG. 1 the release lever 16 is initially not active and is biased by means of a release lever spring 16b into its default position, shown in FIG. 1, which is defined e.g. by an abutment 17.

The locked default position of the locking device 1 shown in FIG. 1 is stable as regards usual loads including usual loads in the direction X. In case of usual loads in the direction X below a threshold value the second component 100 may press the locking region 10b of the locking element 10 somewhat in the direction X (upwards in FIG. 1); due to the contact and clamping effect of the active surfaces 12, 14b and the spring bias of the blocking element 14, however, the locking element 10 is blocked in the locked default position. Thus, it is possible to effectively prevent any backlash in the direction X leading to the locking element 10 becoming unlocked.

To unlock the locking device 1 the user operates the handle 5 of FIG. 4 which directly or indirectly swivels the release lever 16, as indicated in FIG. 2 by the arrow. Hereby, the release lever 16 itself may constitute the handle 5 or may be swiveled by the handle 5. According to FIG. 2, the release lever 16 presses e.g. with its operative arm 16d against an operative arm 14d of the blocking element 14 and swivels this element, whereby suitable swiveling paths and moments are created by the design of the operative arms 16d, 14d and the leveraging forces. This causes the blocking element 14 to be swiveled out of its default position, releasing, for one thing, the active locking surface 12 of the locking element 10; further, the blocking element 14 comes into contact with a lever arm 10c of the locking element 10 swiveling it so that the locking element 10 is actively swiveled out of the blocking default position of FIG. 1 and its locking region 10b is moved out of the receptacle 11.

Thus, the components 16, 14 and 10 form a functional chain for opening the lock, i.e. the locking region 10b in the receptacle 11, as well as for automatic locking or blocking respectively.

In this unlocked (open) position the user can subsequently make the adjustment of the head rest 3. Upon subsequent release of the release lever 16 this will be reset by the spring bias of its release lever spring 16b and releases the blocking element 14 which in turn is swiveled back by its blocking element spring 14c and slides with its active blocking surface 14b along the active locking surface 12 thereby putting the locking element 10 back into the locked default position of FIG. 1.

Thus, a reversible unlocking and locking is possible, where in the default position contact surfaces or, respectively, boundary surfaces are formed:

between the elements 10 and 100, i.e. between the locking region 10b and the receptacle 11, i.e., as well as between the elements 10, 14, i.e. between the active locking surface 12 and the active blocking surface 14b, whereby these contact surfaces or, respectively, abutments are reversible.

In a crash situation the second component 100, e.g. of the head rest support 3b, is accelerated, according to FIG. 3, in the direction X in relation to the first component 90. Thus, the receptacle 11 of the second component 100 presses the locking region 10b upwards rapidly and with a strong force. Thus, possibly, due to the reversible design of the blocking between the active surfaces 12 and 14b, an undesired automatic unlocking might occur in that the locking element 10 swivels the blocking element 14 against its spring bias. However, when this movement in the direction X occurs the counter face 10d of the locking element 10 will come into contact with a crash abutment surface 16c of the release lever 16 and thereby being blocked in its further swiveling motion. Hereby, the force exerted by the locking element 10 on the release lever 16 acts along the drawn line L in the direction of its swiveling axle 16a, i.e. the line L extends from the crash abutment surface 16c to the swiveling axle 16a. Thus, with this load no torque is exerted on the release lever 16, and the release lever 16, fixed in the default position by its release lever spring 16b and the abutment 17, will not be moved. The release lever 16 blocks the adjustment element 10, before its locking region 10b has left the receptacle 11 so that the locking will still be provided even in the crash situation.

FIG. 4 shows the realization of a locking device 1, differing from the embodiment described in the FIGS. 1 through 3 essentially by the more complex shaping of the elements. While the FIGS. 1 through 3 essentially represent schematically the functional effects of the elements 100, 10, 14 and 16, FIG. 4 shows a corresponding embodiment with more complex shaping, in particular, for generating suitable forces and swiveling paths. The springs 14c and 16b of the first embodiment, shown in FIGS. 1 through 2 as tension springs, may, according to FIG. 4, also be placed around the swiveling axles 14a and 16a of the elements 14, 16 as spiral springs.

According to FIG. 4, an engagement or, respectively, form lock between the locking region 110b and the receptacle 111 is provided enabling a latching in different swiveling positions; to that end, the locking region 110b and the receptacle 111 may be designed as rows of teeth including a plurality of teeth 120 engaging with one another allowing a fine ratchet of the adjustability.

The present disclosure relates to an adjustment device for a head rest of a vehicle seat and a vehicle seat including an adjustment device.

A comparative adjustment device enables unlocking by a user and adjustment of the head rest in relation to a back rest both in the longitudinal direction (direction X) and in the vertical direction (direction Z), making for a highly comfortable adjustment, in particular compared to head rest adjustment mechanisms in a merely vertical direction.

Thus, the user can operate the handle dedicated for unlocking and adjust the head rest freely in the longitudinal direction and the vertical direction by directly grabbing the head rest and positioning it suitably. When, subsequently, e.g. he will let go of the handle the head rest locks in the selected position by engagement of locking regions. The locking action eliminates or, respectively, reduces free clearance between the parts to be adjusted. In the event of a crash the locking regions secure the Position of the head rest.

A comparative crash active head rest for a vehicle seat having a carrier, at least one upper and lower linkage linked to the carrier, which can be swiveled around horizontal axles, a baffle element linked to the linkages, which forms at least one quadruple joint with the linkages and the carrier, and an energy storing device driving the quadruple joint.

A comparative head rest for a vehicle seat, having a carrier as well as an upper element and a lower element which are hinged to the carrier and can be swiveled around horizontal axles. Further a baffle element is hinged on the elements and forms a quadruple joint gear with the elements, the carrier and an energy accumulator. In the event of a collision the energy accumulator adjusts the quadruple joint gear such that the baffle element moves forwards from its default position towards the collision position which is blocked towards the read by a collision blocking element. Hereby, however, the clearance of the parts to be adjusted for comfort adjustment is not effectively suppressed in the locked position; moreover, no measures have been provided for increasing crash safety.

A comparative head rest folding arrangement wherein a ratchet element is arranged between a release lever and a locking connector arrangement securing the upright head rest position so that the actuation of the release lever is transmitted to the locking connector arrangement not directly but indirectly by means of the ratchet element supposedly making it easier to operate the release lever. Hereby, however, no specific reduction of the clearance between the locked components and no further measures for crash safety are provided.

A comparative vehicle seat with a comparative head rest and a comparative adjustment device, where a locking device is formed with locking teeth and an upper catch region. No further measures for crash safety are provided.

The present disclosure is based on the object of creating an adjustment device for a vehicle seat enabling good adjustability by the user while providing a high level of crash safety.

This task is solved by an adjustment device for a head rest of a vehicle seat and a vehicle seat according to the independent claims.

Thus, the adjustment device comprises an adjustment mechanism and a locking device which can be unlocked by the user, usually by means of a handle, to allow the user free adjustment in the longitudinal direction and the vertical direction. Subsequently the user can relock the locking device in the new position, in particular, by releasing the handle.

The locking device locks a first and second component which may be e.g. a link of the adjustment mechanism and a head rest support; in principle, however, other components of the adjustment device may also be locked with one another to prevent adjustment.

Hereby, the locking device comprises several adjustable elements, in particular, a release lever pivoting upon actuating the handle, a blocking element, and a locking element which collaborate, in particular, in the manner of a functional chain. These adjustable elements are hinged onto the first of the two components adjustable in relation to one another; the locking element comprises a locking region which locks in a receptacle of the second component.

In-between the blocking element and the locking element two active surfaces which collaborate in the locked state. The two active surfaces provide a reduction or suppression of the clearance (free play reduction) of the two components locked with one another; in the locked default state the two active surfaces lie in contact. To that end the blocking element may be spring biased, in particular, into its default position so that its active blocking surface contacts the active locking surface of the locking element with spring bias, e.g. by way of sliding engagement as clamping surfaces, in particular, with one or both active surfaces being curved surfaces.

This creates the advantage of a clamping effect, in particular, with a spring bias, generating a secure suppression of the clearance and a free play feeling and also a counter-force against usual forces and moments exerted.

In the context of the present disclosure, an engagement of clamping surfaces for suppressing clearance shall mean, in particular, active surfaces of two elements which allow, upon yielding or, respectively, subsequent widening of the distance between the elements, a further spring biased readjustment or, respectively, re-pivoting, in particular, of the blocking element, making it possible to automatically reduce the clearance appearing (widening of the distance). Thus, the active surfaces are slidingly pressed into one another, in particular, in a spring biased manner.

In particular, in the context of the present disclosure, a clamping effect and/or clamping surfaces shall mean an embodiment where active surfaces are biased in a pivoting direction with increasing radius from the pivoting axis.

Further, a high degree of crash safety is provided by a crash abutment of the locking element onto the release lever. In the event of a crash strong forces act e.g. in the longitudinal direction on the components, in particular, also on the head rest support. Due to the high acceleration in the longitudinal direction, e.g. above a threshold value, the second component and the locking element the locking region of which is received in the receptacle of the second component are accelerated in the longitudinal direction. Hereby, the locking element will end up, after a short acceleration path or safety distance respectively, in contact with a crash abutment surface on the release lever stopping the locking element. Thus, it is possible so safely block any further pivoting movement of the locking element and avoid unlocking of the active surfaces which would otherwise be possible given the strong forces exerted in the longitudinal direction, even against the spring bias of the blocking element.

A particular advantage is attained in that the crash abutment between the crash abutment surface of the release lever and the counter-surface of the locking element is provided separate from the active surfaces of the regular locking procedure or blocking motion. Thus, for one thing, it is possible to achieve a secure suppression of the clearance and thereby a firm lock of the components via the active surfaces, whereby the shaping of the active surfaces and possibly the spring bias of the blocking element can be suitable formed and dimensioned for locking and the unlocking process, and, furthermore, separate from this, the crash locking or crash absorption is provided.

Thus, suitable lever arms and adjustment motions, as well as embodiments of the active surfaces may be provided as sliding surfaces or, respectively, sliding and clamping surfaces without also having to provide for, e.g. a secure receptacle of the crash lock in these active surfaces. Even if the active surfaces in the event of a crash, due to the swiveling motion of the locking element, should initially loosen somewhat or, respectively, the active surfaces slide alongside one another, a release will be stopped in time by the crash abutment. Hereby, it is also possible to design the dimensions of the free path of the crash adjustment independent from the dimensions of the active surfaces and the regular blocking.

Comparative devices do not provide for, in particular, this separate design of the active surfaces of the proper locking and the crash abutment so that compromises are present here which, e.g., do not permit a smooth-running sliding process of the active surfaces for the locking mechanism because this would impair the crash safety to be provided by the active surfaces in addition.

A high degree of crash safety is achieved in that, for example, a line extends between the crash abutment surface of the release lever impinged by the locking element in the crash situation and its picot axis in the acceleration direction of the locking element, i.e. e.g. the longitudinal direction. Thus, the accelerated locking element will in the crash situation press the crash abutment surface of the release lever in the direction of its picot axis so that, by virtue of this force, no torque acting on the release lever is generated.

The locked blocking element may be secured by the spring bias of the blocking element and, in particular, also by a spring bias of the release lever, whereby the release lever in the default position e.g. comes into contact with an abutment in a spring biased manner. Hereby, the advantage of a secure resetting into the default position after an unlocking procedure is achieved.

For example, the locking element itself it not spring biased and is pressed into the lock by the blocking element. This creates the advantage, as opposed to e.g. a spring bias of the locking element into the default position, of a stronger clamping effect between the active surfaces and a secure unlocking process.

In the unlocking process the actuated release lever may e.g. swivel together with an operative arm of the blocking element, whereby, owing to the design of the operative arms and the leverage forces, suitable swiveling paths and moments can be generated. Hereby, for example, the release lever is not in contact with the blocking element in the default position and comes into contact with the blocking element following a short swiveling path, whereupon it swivels against its spring bias, thereby causing the active surfaces to disengage. Owing to the distance between the release lever and the blocking element and, preferably, the locking element, an undue release caused be e.g. vibrations and affecting forces is safely prevented.

For example, in the unlocking process the locking element is actively swiveled out of the lock by the swiveled blocking element. To that end the blocking element, in the course of its swiveling movement in which the active surfaces disengage, can come into contact with a lever arm of the locking element and thereby actively swivel the locking element out of the lock. Hereby, preferably, the lever arm is spaced apart from active locking surface. This distance, too, again safely prevents an undue release of the default position caused be e.g. vibrations and affecting forces.

Thus, an active functional chain is created between release lever, blocking element and locking element for active unlocking, providing a high level of safety and robustness, in particular, compared to systems that merely release a spring biased locking element.

Following the unlocking the user can adjust the components as needed in the longitudinal direction and the vertical direction and e.g. subsequently release the handle. Hereby, for example, the spring biased release lever is returned to its default position and releases the blocking element which in turn pivots back into its default position due to its spring bias thereby pressing the locking element into the locked default position in that the active surfaces slide alongside one another. Thus, locking and unlocking are reversible.

A sufficiently fine adjustability can be attained e.g. in that the locking region and the receptacle are designed in the form of e.g. rows of teeth comprising a plurality of teeth engaging with one another enabling a fine ratchet and adjustability in discrete locking positions while still providing firm locking.

The present disclosure relates to an adjustment device (2) for a head rest (3) of a vehicle seat, including a locking device (22) for adjusting a (7) in relation to a back rest connection (40) in a longitudinal direction (X) and a vertical adjusting (Z), where a locking device (1) for locking the adjustment device (2) is provided which comprises a release lever (16) to be activated by the user which swivels a blocking element (14) which in turn swivels a locking element (10).

In the locked default position a locking region (10b) of the locking element is received in or on a receptacle region (11) of a second component (100), where an active blocking surface (14b) of the blocking element (14) is in contact with an active locking surface (12) of the locking element (10) so as to block the locking element (10).

Hereby, the release lever (16) comprises a crash abutment surface (16c) which, in the locked default position, is separated from the locking element (10), and, in a crash situation, comes into contact with the locking element (10) and blocks the locking element (10) when a crash acceleration of the second component (100) occurs.

The following numbered clauses include embodiments that are contemplated and non-limiting:

Clause 1. An adjustment device (2) for a head rest (3) of a vehicle seat (8), the adjustment device (2) comprising:

a back rest connection (40) for mounting on a back rest (4), a head rest support (7), an adjustment mechanism (22) for adjusting the head rest support (7) in relation to the back rest connection (40) in a longitudinal direction (X) and a vertical direction (Z), in an unlocked position, a locking device (1) for locking a first component (90) of the adjustment device (2) in relation to a second component (100) of the adjustment device (2) which is adjustable relative to the first component (90), the locking device (1) comprising a release lever (16) to be activated by the user, a blocking element (14) pivotable by the release lever (16) and a pivotable locking element (10), which are attached to the first component (90), and where, in the locked default position, a locking region (10b, 110b) of the locking element (10) is received in or on a receptacle region (11, 110) of the second component (100), and an active blocking surface (14b) of the blocking element (14) is in contact with an active locking surface (12) of the locking element (10) for blocking the locking element (10), wherein the release lever (16) comprises a crash abutment surface (16c) which, the locked default position, is separate from the locking element (10) and, in a crash situation, is in contact with the locking element (10) and blocks the locking element (10) when a crash acceleration of the second component (100) occurs.

Clause 2. Adjustment device (2) according to clause 1, wherein, in the crash situation, the crash acceleration of the second component (100) occurs in the longitudinal direction (X) relative to the first component (90) and/or the locking element (10).

Clause 3. Adjustment device (2) according to one of the above clauses, wherein the crash acceleration is above an acceleration threshold value that is, preferably, higher than accelerations occurring during handling of the adjustment device.

Clause 4. Adjustment device (2) according to one of the above clauses, wherein, in the crash situation, a direction of acceleration (X) of the crash acceleration extends along a connecting line (L) between the crash abutment surface (16c) of the release lever (16) and a release lever swiveling axle (16a), so as to avoid a crash induced swiveling moment acting on the release lever (16).

Clause 5. Adjustment device (2) according to one of the above clauses, wherein, in the crash situation, the active blocking surface (14b) of the spring biased blocking element (14) is in contact with the active locking surface (12) of the locking element (10) and secures the locking element (10) in the receptacle (11) and in the locked position.

Clause 6. Adjustment device (2) according to one of the above clauses, wherein the first component (90) is an element of the locking device (22), e.g. a link (22a, 22b), and the second component (100) is the head rest support (7), or vice versa.

Clause 7. Adjustment device (2) according to one of the above clauses, wherein the release lever (16) is biased by a release lever spring (16b), preferably also an abutment (17), into its non-activated default position in which its crash abutment surface (16c) is spaced apart from the locking element (10) and/or the release lever (16) is spaced apart from the blocking element (14).

Clause 8. Adjustment device (2) according to one of the above clauses, wherein the blocking element (14) is biased by a blocking element spring (14c) into its locked default position in which its active blocking surface (14b) is in contact with the active locking surface (12) under spring bias, so as to generate a clamping effect and/or for connecting the first and second components (90, 100) free from play.

Clause 9. Adjustment device (2) according to one of the above clauses, wherein the release lever (16), the blocking element (14), and the locking element (10) form a functional chain which is designed in such a way that, upon operation of a handle (5) by the user, the release lever (16) can be swiveled thereby coming, after some free travel, into contact with the blocking element (14) and swiveling the blocking element (14) in such a way that the active blocking surface (14b) releases the active locking surface (12) and the blocking element (14) comes into contact with a lever arm (10c) of the locking element (10) spaced apart from the active locking surface (12) and swivels the lever arm (10c) in such a way that the locking region (10b) is moved out of the receptacle (11).

Clause 10. Adjustment device (2) according to one of the above clauses, wherein, in the default position, there is contact between the active surfaces (12, 14b) of the blocking element (14) and the locking element (10) as well as between the locking region (10b) (10) and the receptacle (11).

Clause 11. Adjustment device (2) according to one of the above clauses, wherein the locking element (10) is provided without spring bias.

Clause 12. Adjustment device (2) according to one of the above clauses, wherein the locking region comprises a plurality of locking teeth (110b) and/or locking recesses, and the receptacle comprises (11) a plurality of receptacle recesses and/or receptacle teeth, e.g. in the form or interlocking rows of teeth, for locking the locking region (10b) in the receptacle (11) in a plurality of different relative positions of the first component (90) relative to the second component (100).

Clause 13. Adjustment device (2) according to one of the above clauses, wherein it comprises a handle (5) to be operated by the user, where the release lever (16) can be swiveled together with the handle (5) as one piece or by the handle (5).

Clause 14. Vehicle seat (8), comprising:
a back rest (4),
a head rest (3) with a head rest support (7), and
an adjustment device (2) according to one of the above clauses, wherein the back rest connection (40) of the adjustment device (2) being attached to the back rest (4) or provided as being a part of the same, and the locking device (22) allowing adjustment of the (7) in the longitudinal direction (X) and in the vertical direction (Z), where the position of the head rest support can be locked in position, by locking the locking device (1), at a plurality of preferably discrete positions of the head rest support (7) relative to the back rest connection (40) in the longitudinal direction (X) and the vertical direction (Z).

Clause 15. Vehicle seat (8) according to clause 14, wherein the locking device (22) comprises a quadruple joint gear including two links (22a, 22b) for longitudinal adjustment of a guide device (6) in relation to the back rest connection (40), and the head rest (7) can be adjusted on the guide device (6) in the vertical direction.

The invention claimed is:

1. An adjustment device for a head rest of a vehicle seat, the adjustment device comprising:
a back rest connection for mounting on a back rest,
a head rest support,
an adjustment mechanism for adjusting the head rest support in relation to the back rest connection in a longitudinal direction and a vertical direction, in an unlocked position,
a locking device for locking a first component of the adjustment device in relation to a second component of the adjustment device which is adjustable relative to the first component,
wherein the locking device comprises a release lever to be activated by the user, a blocking element pivotable by the release lever and a pivotable locking element, which are attached to the first component, and where, in the locked default position, a locking region of the locking element is received in or on a receptacle region of the second component, and an active blocking surface of the blocking element is in contact with an active locking surface of the locking element for blocking the locking element,
wherein the release lever comprises a crash abutment surface which, the locked default position, is separate from the locking element and, in a crash situation, is in contact with the locking element and blocks the locking element when a crash acceleration of the second component occurs.

2. The adjustment device of claim 1, wherein, in the crash situation, the crash acceleration of the second component occurs in the longitudinal direction relative to the first component and/or the locking element.

3. The adjustment device of claim 1, wherein the crash acceleration is above an acceleration threshold value that is higher than accelerations occurring during handling of the adjustment device.

4. The adjustment device of claim 1, wherein, in the crash situation, a direction of acceleration of the crash acceleration extends along a connecting line between the crash abutment surface of the release lever and a release lever swiveling axle, so as to avoid a crash induced swiveling moment acting on the release lever.

5. The adjustment device of claim 1, wherein, in the crash situation, the active blocking surface of the spring biased blocking element is in contact with the active locking surface of the locking element and secures the locking element in the receptacle and in the locked position.

6. The adjustment device of claim 1, wherein the first component is an element of the locking device and the second component is the head rest support, or vice versa.

7. The adjustment device of claim 1, wherein the release lever is biased by a release lever spring into its non-activated default position in which its crash abutment surface is spaced apart from the locking element and/or the release lever is spaced apart from the blocking element.

8. The adjustment device of claim 1, wherein the blocking element is biased by a blocking element spring into its locked default position in which its active blocking surface is in contact with the active locking surface under spring bias, so as to generate a clamping effect and/or for connecting the first and second components free from play.

9. The adjustment device of claim 1, wherein the release lever, the blocking element, and the locking element form a functional chain which is designed in such a way that, upon operation of a handle by the user, the release lever can be swiveled thereby coming, after some free travel, into contact with the blocking element and swiveling the blocking element in such a way that the active blocking surface releases the active locking surface and the blocking element comes into contact with a lever arm of the locking element spaced apart from the active locking surface and swivels the lever arm in such a way that the locking region is moved out of the receptacle.

10. The adjustment device of claim 1, wherein, in the default position, there is contact between the active surfaces of the blocking element and the locking element as well as between the locking region and the receptacle.

11. The adjustment device of claim 1, wherein the locking element is provided without spring bias.

12. The adjustment device of claim 1, wherein the locking region comprises a plurality of locking teeth and/or locking recesses, and the receptacle comprises a plurality of receptacle recesses and/or receptacle teeth, for locking the locking region in the receptacle in a plurality of different relative positions of the first component relative to the second component.

13. The adjustment device of claim 1, wherein it comprises a handle to be operated by the user, where the release lever can be swiveled together with the handle as one piece or by the handle.

14. A vehicle seat comprising a back rest, a head rest with a head rest support, and an adjustment device according to claim 1, wherein the back rest connection of the adjustment device being attached to the back rest or provided as being a part of the back rest, and the locking device allowing adjustment of the head rest in the longitudinal direction and in the vertical direction, wherein the position of the head rest support can be locked in position, by locking the locking device, at a plurality of discrete positions of the head rest support relative to the back rest connection in the longitudinal direction and the vertical direction.

15. The vehicle seat of claim 14, wherein the locking device comprises a quadruple joint gear including two links for longitudinal adjustment of a guide device in relation to the back rest connection, and the head rest can be adjusted on the guide device in the vertical direction.

* * * * *